United States Patent Office 3,164,652
Patented Jan. 5, 1965

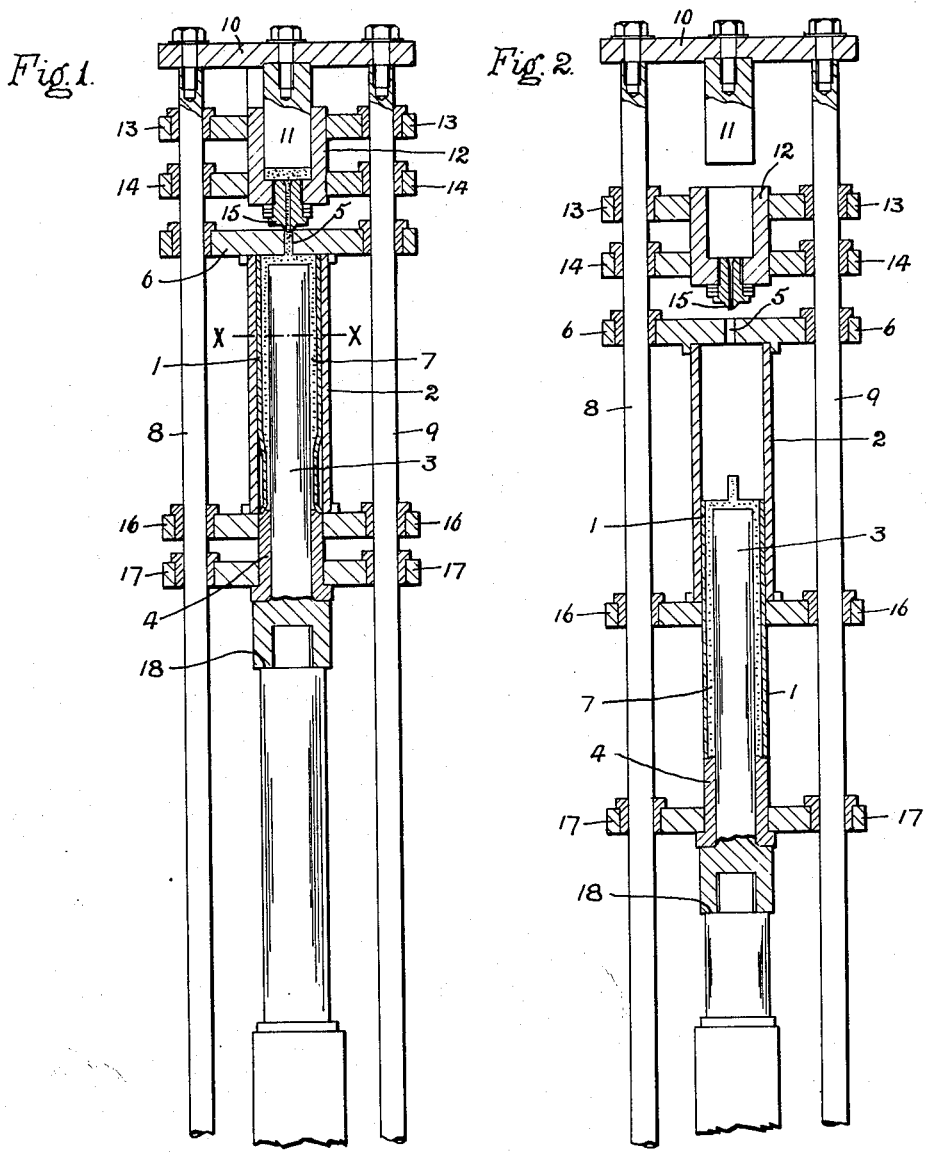
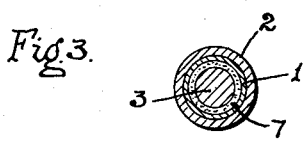

3,164,652
METHOD OF PRODUCING PLATENS FOR
TYPEWRITERS
Edward Victor Byers, 16 Barrack Lane, The Park,
Nottingham, England
Filed Feb. 28, 1961, Ser. No. 92,297
2 Claims. (Cl. 264—262)

This invention relates to improvements in the method of producing platens for typewriters. The platens of typewriters are cylindrical and are rotatably mounted in a carriage movable longitudinally and transversely of the point to which the type levers move to make their impression on paper placed round the platen so that by adjusting the position of the platen and carriage any part of the paper round the platen can be brought to the point of impression. The surface of the platen is formed from a covering of material capable of offering appreciable restraint to the movement of paper or the like pressed into contact with it. This covering is sometimes made of cork but is far more often formed by a rubber covering and it is to the manufacture of rubber covered platens that the invention particularly relates. The design of most typewriters impose stringent requirements concerning the surface finish and cylindrical accuracy of the platen to ensure equality of impressions. In platens as hitherto made the rubber covering is formed from a rubber tube and it has hitherto been impractical to manufacture the rubber covering tubes with the necessary surface finish and cylindrical accuracy for direct use on an inner rigid roller. Consequently after the rubber covering has been placed on the inner roller the outer surface is machined either by turning or grinding to obtain the necessary surface finish and cylindrical accuracy. The object of the present invention is to provide a method of manufacturing a platen by which the required surface finish and cylindrical accuracy is obtained without the need for machining of any kind.

According to this invention the method of producing platens consists in placing a length of rubber tube having a suitably finished outer surface in a cylindrical mould having a smooth cylindrically accurate inner surface, inserting a mandrel in the mould concentric therewith and forcing plastic material into the mould and into the space between the inside of the rubber tube and the mandrel under sufficient pressure to fill the space and force the outer surface of the rubber tube into contact with the inner surface of the mould. The internal diameter of the mould is made large enough to allow for the shrinkage in the plastic material during setting so that when the rubber covered plastic sleeve or core is removed from the mould it is of the correct diameter for the platen.

The invention will now be more particularly described with reference to the accompanying drawings in which:

FIG. 1 is a sectional elevation of a moulding machine for inserting the plastic sleeve in the tubular rubber covering of a platen roller showing the plastic being inserted in the tube.

FIG. 2 is a sectional elevation of the moulding machine showing the removal of the mandrel round which the plastic sleeve is formed after moulding the sleeve.

FIG. 3 is a sectional plan on the line XX of FIG. 1.

Like letters indicate like parts throughout the drawings.

In carrying out this invention the rubber tubular covering 1 for the platen is formed by extrusion on to a mandrel having a highly finished surface and is then cured whilst in contact with the mandrel by wrapping it in canvas and treating it with steam. The canvas wrapping also serves to protect the rubber from the eroding action of the curing steam. The rubber tubes are made by this or any other suitable process in lengths of about seven feet and after curing are cut into lengths suitable for platens. These latter lengths are then turned inside out so that they present a perfectly smooth outer surface produced by contact with the mandrel.

The platen lengths of rubber tubing 1 are then placed in a cylindrical mould 2 which is attached to a plastic moulding machine. The mould is of a suitable length and is provided with a highly finished inner surface. A mandrel 3 is then placed in position in the mould concentric therewith. The inner end of the mould may be formed so as to hold the end of the rubber tube in its correct axial position whilst the outer end of the mould is closed by a member 4 of suitable shape. A small hole 5 is provided in a closure member 6 at the inner end of the mould 2 between the inside of the rubber tube 1 and the mandrel 3 for the admission of the plastic 7. Molten plastic is forced through this hole 5 into the space between the mandrel 3 and the inner side of the rubber tube 1 filling the space and forcing the outer side of the tube 1 into contact with the inner surface of the mould 2 as shown in FIG. 1 thus ensuring the cylindricity of the outer surface of the rubber tube.

When the plastic 7 has set the rubber covering and plastic sleeve can be removed from the mould 2 the setting of the plastic taking place before the heat from the molten plastic has any adverse effect on the rubber covering. The ends of the mould may be shaped to form recesses on the ends of the sleeve to receive plastic inserts to complete the platen roller and provide holes for the platen spindle. The actual internal diameter of the mould must be determined so as to allow for the shrinkage experienced when moulding plastics so that the finished diameter of the platen is that required.

The plastic moulding machine is constructed and works in the following manner. Secured to the top of two columns 8, 9 is a cross member 10 which carries a fixed plunger 11. Below the plunger 10 is an electrically heated plastic container 12 which is carried by cross members 13, 14 slidingly mounted on the columns 8, 9. The container 12 is provided with an outlet nozzle 15 in its base through which molten plastic is extruded by the plunger 11 as hereinafter explained. The mould 2 is supported on a platform 16 slidingly mounted on the columns 8, 9 and its upper end is closed by the cross member 6 when moved into engagement therewith. The lower end of the mould is closed by a member 4 having a hole therethrough for the passage of the mandrel 3. The member 4 is carried by a platform 17 which is slidingly mounted on the columns 8, 9.

In carrying out the moulding operation the mandrel 3 is moved to its lowest position and the cross members 13, 14 and 6 fall to the positions in which they are shown in FIG. 2. The platform 16 moves downwards to a position sufficiently below that shown in FIG. 2 to allow the mould 2 to be placed in position on the platform 16. The platform 17 falls to a position sufficiently far below the lowest position of the platform 16 to allow for the rubber tube with its plastic sleeve therein being removed from the member 4 when the mandrel 3 is in its lowest position, in which position its upper end is in or below the member 4. When the various parts of the moulding machine are in the positions as above described a suitable quantity of plastic material in powder or granular form is placed in the heated container 12. A length of rubber tube is placed in the mould 2 and the latter placed in position on the platform 16, suitable locating means being provided on the platform 16 to hold the mould in its correct position. When the plastic in the container 12 has melted the mandrel 3 is raised. The mandrel 3 passes through the member 4 until the shoulder 18 thereon engages the lower end of the member 4 when the latter moves upward with the mandrel 3. When the member 4 is located relatively to the platform 16 as shown in FIG. 1, the platform 16 moves upwards with the mandrel 3 and member 4 and the upper end of the mould 2 engages under the cross member 6 and carries this upwards. As the cross member 6 moves upwards the hole 5 therein is moved into engagement with the nipple 15 on the container 12. The upward movement of the mandrel 3 still continues and consequently the container 12 moves upwards. As a result the plunger 11 enters the upper end of the container 12 and the molten plastic therein is forced through the nozzle 15 into the space between the rubber tube 1 and the mandrel 3 as shown in FIG. 1. The upward movement of the mandrel 3 continues until the space between the rubber tube and mandrel is filled and the outer surface of the rubber tube forced into close contact with the inner surface of the mould 2. When sufficient time has been allowed for the plastic to set, the mandrel 3 is lowered. As the mandrel 3 moves downward the various parts begin to separate as shown in FIG. 2 and move downwards until they reach their lowest positions. When the platform 16 reaches its lowest position, the continued downward motion of the mandrel 3 draws the rubber tube 1 with its moulded sleeve out of the mould 2. When the platform 17 reaches its lowest position the tube on its moulded sleeve is clear of the platform 16. The mandrel 3 continues to move downwards and withdraws from the tube 1 with its moulded sleeve. The tube 1 with its moulded sleeve is then removed from the member 4 and the operation described is repeated.

Several known plastic materials can be used to form the core of the platen and the polystyrenes and polystyrene butadiene mixtures may be used.

With platen rollers manufactured as described a perfectly smooth and cylindrical outer surface is produced during manufacture so that any subsequent machining of any kind is obviated with a consequent saving in time and cost of manufacture.

What I claim is:

1. A method of producing composite plastic and rubber platen rollers for typewriters which consists in extruding rubber on to a cylindrical mandrel having a highly finished surface, curing the rubber whilst on the mandrel, removing the tube thus formed from the mandrel and turning it inside out, placing a length of the tube in a cylindrical mould having a smooth cylindrically accurate inner surface, inserting a second mandrel in the tube concentric with the inner surface of the mould and forcing plastic material in a molten state into the space between the tube and mandrel to fill the said space and force the outer surface of the tube into close contact with the inner surface of the mould and removing the tube and plastic material from said second mandrel and said mould as a unit.

2. A method of producing composite plastic and rubber platen rollers for typewriters which consists in extruding rubber onto a cylindrical mandrel having a highly finished surface, curing the rubber while on the mandrel, removing the tube thus formed from the mandrel and turning the tube inside out, placing a length of the tube in a cylindrical mold having a smooth cylindrically accurate inner surface, inserting a second mandrel in the tube concentric with the inner surface of the mold and forcing plastic material in a molten state into the space between the tube and mandrel to fill the said space and force the outer surface of the tube into close contact with the inner surface of the mold, withdrawing the mandrel from the mold with the plastic material and rubber tube thereon, and then removing the tube and plastic material from the mandrel as a unit.

References Cited in the file of this patent

UNITED STATES PATENTS

| | | |
|---|---|---|
| 753,959 | Crump | Mar. 8, 1904 |
| 830,432 | Hennessey | Sept. 4, 1906 |
| 1,442,296 | Privett | Jan. 16, 1923 |
| 1,459,244 | Palmer | June 19, 1923 |
| 1,745,482 | Goodwin | Feb. 4, 1930 |
| 1,870,661 | Vogt | Aug. 9, 1932 |
| 1,909,726 | Serenyi | May 16, 1933 |
| 1,916,495 | Shaw | July 4, 1933 |
| 1,916,692 | Scribner | July 4, 1933 |
| 2,273,995 | Rogerson et al. | Feb. 24, 1942 |
| 2,570,284 | Stott et al. | Oct. 9, 1951 |
| 2,583,329 | Eckert | Jan. 22, 1952 |
| 2,700,841 | Cook et al. | Nov. 20, 1956 |